June 15, 1971     B. SILLER     3,585,082
VENTED GALVANIC ELEMENT AND DRY CELL
Original Filed April 20, 1967     2 Sheets-Sheet 1
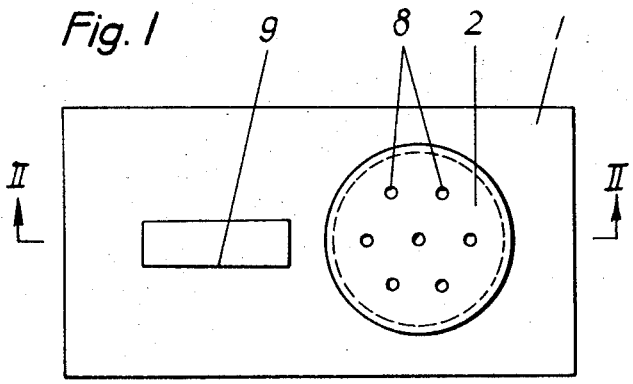
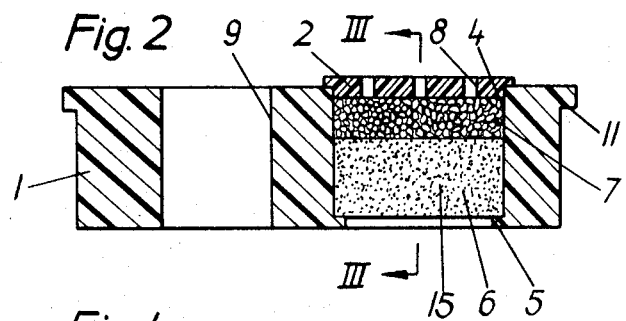
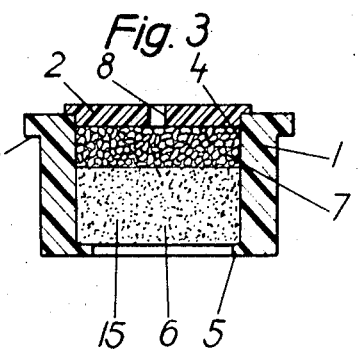
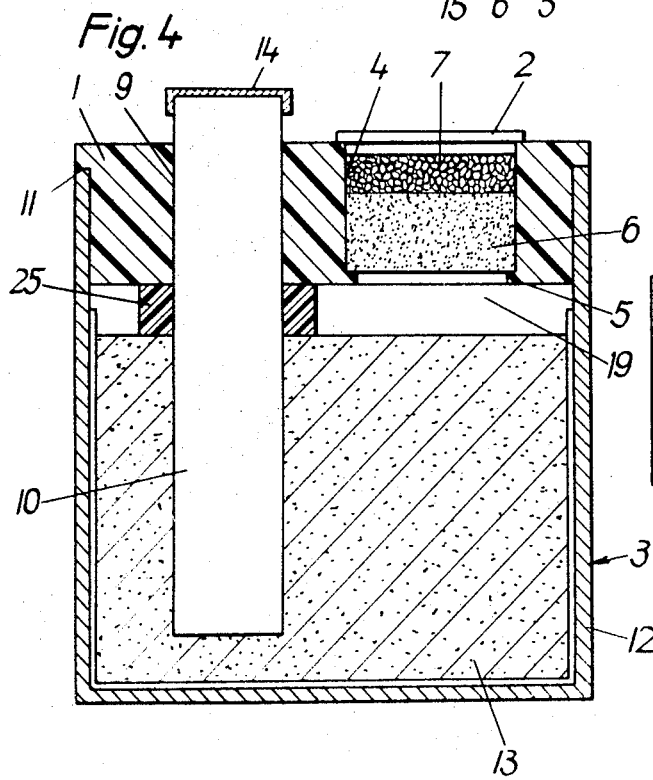
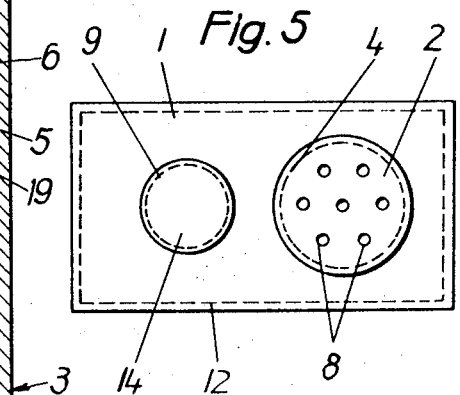
INVENTOR.
BRUNO SILLER
BY
ATTORNEY.

June 15, 1971 B. SILLER 3,585,082
VENTED GALVANIC ELEMENT AND DRY CELL
Original Filed April 20, 1967 2 Sheets-Sheet 2

INVENTOR.
BRUNO SILLER
BY Gerard J. Weser
ATTORNEY.

United States Patent Office

3,585,082
Patented June 15, 1971

3,585,082
VENTED GALVANIC ELEMENT AND DRY CELL
Bruno Siller, Ellwangen, Jagst, Germany, assignor to Varta Pertrix-Union Gesellschaft mbH, Ellwagen, Jagst, Germany
Continuation of application Ser. No. 632,358, Apr. 20, 1967. This application Aug. 27, 1969, Ser. No. 856,879
Claims priority, application Germany, Apr. 23, 1966, V 30,923
Int. Cl. H01m 1/06
U.S. Cl. 136—178        6 Claims

ABSTRACT OF THE DISCLOSURE

A galvanic element, and particularly a dry cell with a negative electrode designed to serve as the housing of the element or cell, in which a pressure actuated device is provided for venting gases generated in the cell, the device comprising a porous member flooded with a non-volatile, inert liquid.

RELATED APPLICATION

This is a continuation of applicant's prior application Ser. No. 632,358, filed Apr. 20, 1967, which is now abandoned.

BACKGROUND OF THE INVENTION

Field of the invention

The present invention relates to a galvanic element with a novel means of closure and more particularly to a dry cell with a housing in which a novel means of relieving excess internal pressure is provided.

Description of the prior art

As is well known, dry cells having an aqueous electrolyte tend to dry out when subjected to extended periods of use or storage. It is therefore necessary to close off the interior of the cells from the outside atmosphere sufficiently well to prevent a change in moisture content. However, if the cells are hermetically sealed, the gases generated in the cell during storage and use cannot escape and develop unacceptable high pressures in the cell. It is therefore necessary to provide means for the gases generated within the cell to escape from the cell chamber into the atmosphere, when assembling and closing off the cell. Generally, the gases may escape, when they develop a high enough pressure, through slight imperfections in the closure of the housing. However, with this haphazard mode of disposal of the excess gases from the interior of the cell, appreciable pressures may build up in the interior of the cell. This mode of gas disposal is generally satisfactory with a round cylindrical cell, because in this type of cell the cylindrical wall area can withstand considerable internal pressure without undue deformation of the housing of the cell and without undue effect on the usefulness of the cell.

Such is not the case, however, with a galvanic element or dry cell which has a housing of prismatic form and is e.g. of rectangular section. This form of cell is very sensitive to excess internal pressure, and a relatively slight pressure increase in the interior of the cell may result in considerable deformation of the walls of the housing. As a result, the cell may become unattractive in appearance or its functional performance may be adversely affected. It is therefore advantageous to provide the cell with a closure which includes a valve which normally holds the cell closed and which permits the escape of gases with minimal excess pressure build-up in the housing. It is likewise important that the closure should normally provide a seal sufficient to prevent the drying out of the cells. For this purpose, closures are known for such dry cells or batteries which include a type of valve which is normally closed and held tightly shut by the force of suitable springs and in which the force exerted by the spring is adjusted in such manner that a slight increase in gas pressure in the interior of the cell effects the opening of the valve to permit the escape of the excess gas. Precision valves of this kind are expensive and thus economically unacceptable. Less costly valves of this type are generally not satisfactory, because it is difficult to manufacture them inexpensively and yet ensure that they will open and release excess pressure at an exact predetermined pressure level. The closing force exerted by the spring is also subject to change as the valve is repeatedly actuated. Even the simplest and most economical valves of this type are still relatively expensive and are difficult to install in cells of small size. Such valves therefore are rarely used in the mass production of vented dry cells.

It is therefore an object of the present invention to provide a novel galvanic element or dry cell which includes in the closure a valve which is simple, reliable and inexpensive to manufacture and which is readily installable in even the smallest of dry cells.

It is another object of the invention to provide a novel galvanic element or dry cell which contains a valve that operates reliably over long periods of time and which responds to a predetermined very small increase in internal pressure, so as to permit the release of gases causing the increased pressure in the interior of the cell or element, and which otherwise maintains the cell securely closed off from the outside atmosphere.

Other objects will become apparent from the attached drawings and from the detailed description of the invention.

SUMMARY OF THE INVENTION

The objects of the invention are achieved by a galvanic element, and particularly by a dry cell and a dry cell battery in which the negative electrode forms a container, or casing, surrounding the other cell components and serves as the housing for the element or cell, which element or dry cell includes a valve made from a porous material and a high boiling, inert liquid contained in the pores of said porous material thus forming a means of closing off the interior of the element or cell or battery from the outside atmosphere and yet permitting the escape of gases forming within the cell, battery or element, when a predetermined excessive pressure develops within the cell. The novel valve of the invention is preferably mounted in the top face or in the covering lid of the cell, element or battery.

BRIEF DESCRIPTION OF THE DRAWINGS

The invention is illustrated in the drawings in which:
FIGS. 1, 2 and 3 are schematic representations of plan, side elevation, and end elevation views, the latter two in cross-section, respectively, of a rectangular cover of the invention fitted with a valve comprising a porous vent structure filled with a liquid barrier.
FIG. 4 is a schematic representation in cross-section showing a rectangular galvanic element embodying the cover of the invention fitted with a valve comprising a porous vent body structure filled with a liquid barrier.
FIG. 5 is a top view of the dry cell of FIG. 4.

DESCRIPTION OF THE PREFERRED EMBODIMENTS

Figure 7:
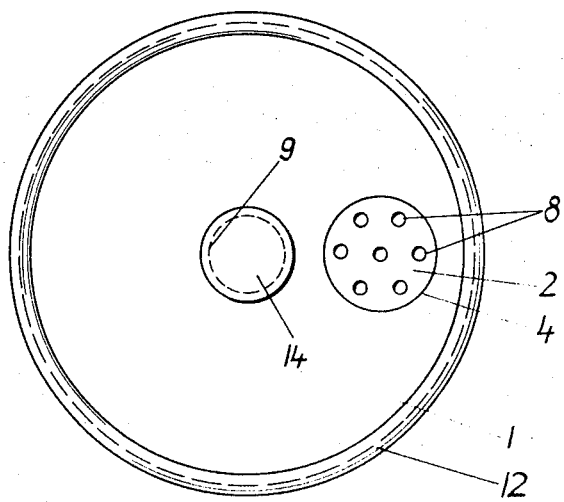
FIG. 7 is a top view of the dry cell of FIG. 6.

The galvanic element or dry cell of the invention comprises generally the known basic components used in the construction of such an element or cell, viz. a positive and a negative electrode, or several electrodes of one or both kinds, and a liquid electrolyte surrounding the electrodes and usually an absorbent for the electrolyte for the prevention of spillage or leakage of the electrolyte, all arranged in a housing in a suitable and known manner. See, for example, George Wood Vinal "Primary Batteries," John Wiley & Sons, New York (1950), incorporated herein by reference. The negative electrode may be shaped to form the housing which is generally closed at the top by a covering lid made from an electrically insulating material, through which the positive electrode or electrodes or an electrically conducting lead and terminal, connected to the positive electrode, project. The valve for the venting of the gas formed in the cell or element is preferably provided in said covering lid.

The porous body of the valve of the present invention may be made from a variety of porous materials which are resistant to corrosion and attack by the components used in the cell, especially by the electrolyte. Preferably, the porous body is made by sintering suitable thermoplastic powdered or granulated materials. Most preferred for this purpose are powders of glass or of thermoplastic, high polymeric organic materials such as polyethylene, polypropylene, polystyrene, polytetrafluoroethylene, polyvinylidene fluoride, polyvinylchloride, polytrifluorochloroethylene and a copolymer comprising a major proportion of any said polymer. Any other method to make the body porous is also satisfactory.

The sizes of the pores in the sintered porous body are determined primarily by the sizes of the particles of the powdered or granulated starting material used in the sintering process. The arts of sintering glass and thermoplastic particles are well known and the techniques of such arts are useful for the preparation of the porous bodies used in practicing the present invention. By suitable choice of the particle sizes of the powder, it is therefore possible to vary the pore sizes in the sintered bodies and to adjust them to the special requirements in each individual application as will be shown hereinafter.

The most favorable sizes of the pores depend on various factors such as the nature of the material from which the porous body is made and the nature of the liquid which is used as the barrier. Typical pore sizes for sintered bodies made from glass powder are in the range from about 0.1 to about 0.2 mm., though also larger or smaller pore sizes are acceptable in many situations. The preferred range of pore size with porous bodies made from other materials may be smaller or larger and may be readily determined by simple tests employing the liquid which is actually to be used in the valve in the cell cover. The sintered body is preferably mounted and press seated in a suitably shaped hole provided in the top of the housing of the element or cell or in the separate cover lid if such is used.

In another embodiment of the invention, the porous body of the valve may be formed from other materials such as closely-packed fine fibres, especially those made from organic and inorganic polymeric materials, glass, asbestos, or metal. Advantageously, the individual fibres in the bundle may be united by sintering, weaving or by binding processes, e.g. by use of inert adhesives, to form a unitary body with fine channel pores extending throughout the body.

In a preferred embodiment, short sections of electrical wiring, consisting of a large number of strands of fine, unbraided individual wires matted together, are used for the purpose of the present invention. For this embodiment, it is preferable to use fine wiring having a sheath of an insulating material which is left in place and by which the sections of matted wire can be readily mounted in an opening in the top or cover lid of the element or cell, so that the fine channel-like apertures between the strands establish passageways which conduct gases from the interior of the cell to the outside atmosphere.

The porous or permeable body forming the solid structure of the valve in the element or cell of the invention is filled with a stable liquid barrier which preferably is a high boiling liquid which has a very low vapor pressure at room temperature and thus is substantially nonvolatile. Generally preferred are high boiling liquids which are non-corrosive and which do not attack the porous valve body structure of the surrounding solidify or absorb water under the effects of the oxygen and moisture of the air and of other factors resulting from the storage and use of the element or cell, and which are relatively non-volatile at cell storage and operating temperatures. The viscosity of the liquid should be such that it flows readily into and out of the pores of the porous body at low temperatures.

Liquids which are suitable for use as the barrier in the valve of the invention include the commercially available hydrocarbon vacuum oils, silicone oils, and other synthetic polymeric liquids, e.g. fluorocarbon telomer oils. These and many other suitable liquids are relatively permanent and there is no danger that they will dry out or absorb excessive amounts of water over extended periods of time.

Aromatic phosphates, e.g. tricresylphosphate and diphenylcresylphosphate, are especially advantageous and are preferred. Other phosphate esters also may be used.

The term non-volatile as used herein is intended to define a liquid which will not evaporate substantially at the highest temperautre which will be experienced during operation or storage of the galvanic element or dry cell or battery. Since the cell will not ordinarily reach a temperature as high as 100° C., any liquid having a much higher boiling point than water will be useful, if otherwise inert. The aromatic phosphates, which boil above 275° C. at 20 mm. pressure are thus especially suitable. The term stable is intended to define a liquid for use in the invention which is chemically stable against attack by the electrolyte of the cell, which will not attack the porous body or any other component of the cell and which is physically stable at elevated temperature and is non-hygroscopic.

The porous body forming the valve structure, when filled totally or in part with the high boiling liquid barrier forms a gas tight closure for the cell or element. As gas is generated in the cell or element, the pressure in the interior of the cell increases, with the result that the high boiling liquid is displaced from the porous body toward the outside, opening up a path for the gases through the pores to the atmosphere.

By the proper choice of the size of the pores and the surface tension of the high boiling liquid used in each instance, it is possible to set the exact pressure at which the gases start to pass through the porous body structure to leave the cell.

The valve of the invention operates on the principle that the pressure building up in the cell or element must be high enough to overcome the capillary forces which retain the liquid barrier in the porous valve body. The capillary forces in a given valve body structure are nearly constant and remain so and are determined by the nature of the materials and the size and shape of the pores in the porous body.

It was found that in elements or cells having a rectangular cross section, the valve may be so adjusted, by choice of the size of the pores and the material of the porous body and by choice of the high boiling liquid used therein, that an excess pressure in the interior of the cell or element corresponding to a water column of about 50 to 60 cm. is sufficient to push the liquid out of the pores and to open the way for the escape of the gas. When the pressure in the interior of the cell element drops as a result of the venting of the gas, the liquid is drawn back into the pores as a result of the capillary forces in the porous body, and the cell or element is closed off again from the outside. Of course, the permissible excess gas pressure in a cell varies and depends on the construction, design and nature of the cell materials and on other factors. The above stated values for the internal pressure at which the gases begin to escape, to which the valve of the invention is set or adjusted for release of the gas, are merely typical values given by way of example and do not represent the operational range of the invention.

Referring now to the drawing; especially to FIGS. 1–5, 1 is a thermosetting plastic, e.g. epoxy resin, cover for a galvanic element 3. The cover 1 is provided with an opening 4 running from top to bottom of the cover and having a ridge 5 at its bottom edge. A finely porous sintered polyethylene body 6 is tightly fitted into the opening 4 and rests on ridge 5. A coarsely porous sintered polyethylene body 7 is also tightly fitted into opening 4 and rests on body 6. A perforated polyethylene plug 2 is tightly fitted in opening 4 and holds bodies 6 and 7 in place against ridge 5 in opening 4. The perforations in plug 2 are in the form of cylindrical passages 8. Cover 1 is provided with an opening 9 for receiving a positive, e.g. carbon, electrode 10 of the galvanic element 3. Cover 1 is further provided with a shoulder 11 by which the cover is seated against the metal, e.g. zinc casing 12 forming the negative electrode of the galvanic element 3. Depolarizer 13, e.g. manganese dioxide powder, impregnated with electrolyte, e.g. aqueous ammonium chloride, is disposed in the casing 12, with the electrode 10 embedded therein. The electrode 10 is provided with a metal, e.g. copper, contact cap 14. The pores of porous body 6 are filled with the liquid barrier 15, e.g. a light mineral oil having characteristics of 10W motor oil.

The galvanic element 3 is assembled into the form shown in FIGS. 1 and 2 in a known manner by depositing and pressing depolarizer 13 containing the desired electrolyte in casing 12 with electrode 10 in proper position to permit opening 9 to slide over electrode 10. Cover 1, with the elements 2, 6, 7 already inserted and having the liquid 15 in pores of 6, is inserted into the end of casing 12. A sealing material, e.g. epoxy resin adhesive, is wiped around the outer edge 16 of the cover and the inside of opening 9. The cover is then pressed into place in casing 12. The electrode 10 is capped with the metal contact cap 14. The galvanic element is then ready for use.

During storage of the galvanic element 3, the liquid 15 seals off the interior of the cell from the external atmosphere.

When the galvanic element 3 is placed in discharging condition, e.g. by the forming of an electrical bridge between the electrodes 10 and 12, gas formed in the cell collects in the void space 19 below the porous body 6 and above the depolarizer 13. As the pressure of gas builds up in space 19 to a pressure sufficient to overcome the capillary forces in the pores of porous body 6, the liquid 15 is displaced upwardly out of at least some of the fine pores of body 6 and into the coarse pores of body 7, and the gases then escape from space 19 via pores of body 6 into the coarser pores of body 7, which are not completely filled with the liquid, and vent through the perforations 8 of plug 2. The capillary forces in th pores of body 6 then act to draw the liquid back from the coarse pores of body 7 and into the fine pores of body 6, thus sealing the interior of the galvanic element 3 against moisture, oxygen and other atmospheric contaminants. The galvanic element 3 thus can be stored and operated through many venting cycles without danger of contamination and without danger of rupturing the galvanic element 3 or of distorting it.

Figure 6:
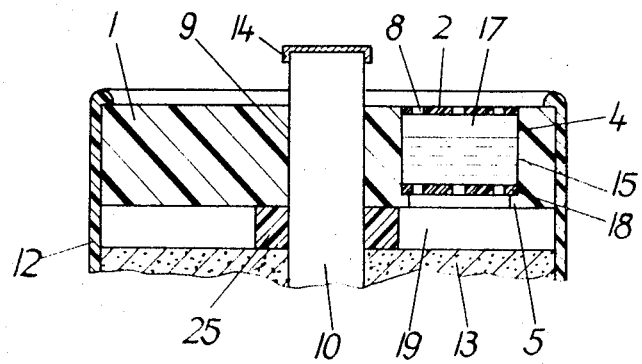
FIG. 6 is a schematic representation in cross-section showing a fragment of a cylindrical dry cell embodying a cover of the invention fitted with a valve comprising a fibrous form of gas permeable mass filled with a liquid barrier.

In FIGS. 6 and 7 is shown an embodiment of a cylindrical dry cell according to the invention in which the valve is in the form of a mass of polypropylene fibres 17 flooded with the barrier liquid 15, e.g. a medium viscosity silicone oil, supported in the opening 4 on a perforated plate 18 supported on ridge 5 and closed with perforated polyethylene plug 2 having vent openings 8. The cover 1 in this embodiment is formed without the shoulder 11 of the cover of FIG. 4 and is assembled into the casing 12 by pressing the cover down on to the distance piece 25 resting in turn on the depolarizer mass 13 and rolling the upper edge inwardly to clamp down cover 1.

In storage and operation, the dry cell of FIGS. 6 and 7 operates in the same manner as described for the galvanic element 3. Although in this cylindrical form of casing the dangers of rupture and distortion are less, the invention advantageously permits the use of a less rugged structural casing, which can be thinner than that used in a non-vented dry cell and thus results in a saving of casing material metal. The advantages of the novel vent, i.e. internal pressure regulation and good sealing are nevertheless, obtained whether or not the casing is made thinner.

Figure 9:
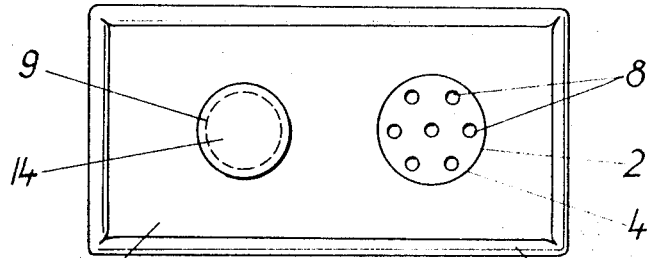
FIG. 9 is a top view of the dry cell of FIG. 10.
Figure 8:
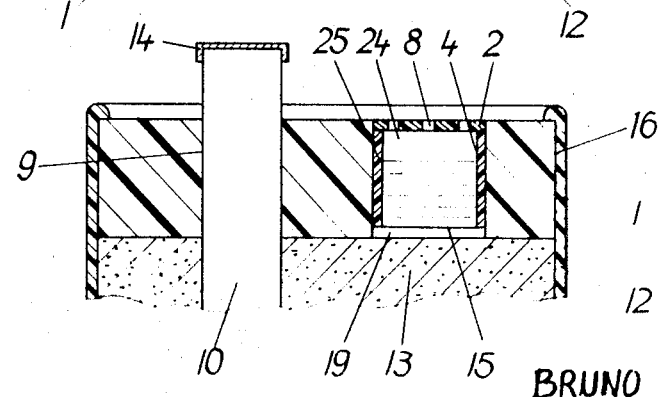
FIG. 8 is a schematic representation of a fragment of a dry cell showing a rectangular form of a cell embodying a cover of the invention fitted with a valve consisting of a short section of twisted electrical wires encased in a thermoplastic, e.g. polyvinylchloride, covering which has been inserted into the vent opening of the cover and saturated with a liquid barrier.

In FIGS. 8 and 9 is shown an embodiment in which the valve is a short segment of polyvinylchloride covered electrical wiring which is saturated with a tricresylphosphate or other suitable liquid barrier material. This form of valve is relatively simple and in many cases will be advantageous to use, especially where only slight venting problems exist. The segment can be of any suitable length or diameter. Thus, a suitable segment is a length of 3–4 mms., of commercial multi-core copper wire consisting of 24 separate strands, each 0.2 mms. in diameter and twisted together in a long twist, all encased in polyvinylchloride. The segment is impregnated under vacuum with a preferred liquid, e.g. tricresylphosphate or diphenylcresylphosphate and is then ready for insertion in the cover.

Although only single galvanic elements or dry cells are illustrated it will be obvious to one skilled in the battery art to combine any number of such elements or cells in series or parallel in a battery, each cell having the advantages and benefits provided by the invention.

Referring again to FIGS. 1–5, the porous body 6 also can be in the form of a cylindrical sintered body of glass, which is inserted with close fit to the walls of the opening 4. The sintered body 6 may be cemented into the opening 4, e.g. by the use of a suitable casting resin. It is preferred that the sintered material, or other porous body 6 has a thickness which is less than that of the cover lid 1, so that a cup shaped depression is left above the top of the sintered body 6. This depression which is the space occupied by elements 7 and 2 in FIG. 3 is provided to hold the barrier liquid 15, e.g. diphenyl cresylphosphate, when it is pressed out of the pores of porous sintered body 6 into the cup shaped depression. Element 7 is a porous material having coarse pores compared to the fine pores of body 6. The coarsely porous material 7 may be a woven material, which may be made, for instance, from a synthetic fibrous material, e.g. polytetrafluoroethylene, or polyvinylchloride. In order to protect the porous valve bodies of the invention from dirt and dust or other contamination, it is preferable to cover aperture 4, after insertion of the porous sintered body 6 and the porous material 7, with a small strip or piece of a suitably shaped plastic material, in the manner of the plug 2 of FIG. 3. This strip or piece may be inserted into the upper cup shaped depression. It is to be noted that the plastic strip or piece is inserted in such manner that it forms a lid or plug which does not cause gas tight closure of the aperture.

The galvanic element or cell of the invention has been described hereinbefore with particular reference to dry cells having a rectangular, cylindrical or square form of housing. The novel closure means and valve of the invention may, of course, also be employed with great benefit in dry cells and in galvanic elements having any other desired shape and construction. The invention is therefore not limited to any particular design of the galvanic element or dry cell except as defined in the appended claims.

Preparation of a finely porous sintered glass body for use in the practice of the invention is illustrated by the following non-limiting example.

EXAMPLE 1

Jena glass, type G20, was ground to a fine powder and the fraction of particles with a diameter of between 0.1 and 0.2 mm. was separated by sifting. About 7 gms. of the particles were wetted with about 1 gm. of 25% sodium silicate solution. The mass was molded at 30 p.s.i. into cylinders 3 mm. long and 4 mm. diameter. The cylinders were dried at 80° C. and then sintered at 700–710° C. for about 1.5 hours. On cooling, the cylinders were impregnated under vacuum with tricresylphosphate or with diphenylcresylphosphate, as desired. The cylinders are pressed into the vent opening in a cover after being lightly coated with an appropriate adhesive.

The liquid barrier material also can be triphenylphosphate; or a silicone, e.g. polymethylsiloxane or poly(methyl,phenyl)siloxane; or a light to heavy perhalocarbon oil, e.g. a polymer of trifluorovinylchloride $$(-CF_2CFCl)_x$$

sold as a Fluorolube by Hooker Chemical Company; or a fluorocarbon telomer, e.g. a telomer oil of fluoroform with ethylene, $F_3C(C_2H_4)_mH$; or a hydrocarbon oil refined from petroleum crude oil; or a fluorinated hydrocarbon oil, e.g. perfluorinated kerosene. In each instance, the particular oil is readily selected to have a suitable viscosity and non-volatility as described above.

It is to be understood that the illustration and description of the apparatus herein is by way of example and that modifications may be made therein while retaining all or some of the advantages and benefits of this invention, which itself is defined in the following claims.

I claim:

1. In a galvanic element including a container and a cover therefor with an opening therethrough, a gas venting valve comprising: a gas-permeable porous member extending into said opening; a perforated lid closing said opening; and a substantially non-volatile liquid contained in the pores of said member; said member comprising two distinct layers, one nearer the interior of the container and the other nearer the exterior, said interior layer having substantially finer pores than said exterior layer, said liquid substantially filling said finer pores of said interior layer and being retained therein by capillary action sufficient to form a barrier to the passage of gas below a predetermined pressure in said container, but allowing gas above said pressure to displace said liquid from said interior layer pores into said exterior layer pores which are sufficiently large to be not filled by said displaced liquid, whereby said gas above said pressure vents through said porous member and said perforated lid, said liquid being of such viscosity that it flows back into said finer pores and thereby reforms said gas barrier when said gas pressure drops back below said predetermined pressure.

2. The galvanic element of claim 1 wherein said liquid is tricresylphosphate or diphenylcresylphosphate.

3. The galvanic element of claim 2 wherein said gas permeable member comprises a multiplicity of strands of unbraided wire matted together to provide fine channel like pores or passageways.

4. The galvanic element of claim 1, wherein said member is made of sintered thermoplastic powdered or granulated material.

5. The galvanic element of claim 1, wherein said member is made of sintered glass powder, said pore layers of different sizes being formed by utilization of powder of different particle sizes for said layers.

6. The galvanic element of claim 5, wherein said finer pores are in the range from about 0.1 mm. to 0.2 mm. in size.

References Cited

UNITED STATES PATENTS

| 3,100,165 | 8/1963 | Chapman | 136—177 |
| 3,218,197 | 11/1965 | Carmichael et al. | 136—177X |
| 3,398,026 | 8/1968 | Andre | 136—178 |

FOREIGN PATENTS

| 613,344 | 11/1948 | Great Britain | 136—177.2 |
| 877,785 | 4/1953 | Germany | 136—179 |
| 1,045,855 | 10/1966 | Great Britain | 136—178 |

DONALD L. WALTON, Primary Examiner

U.S. Cl. X.R.

220—44